3,388,997
PROCESS FOR PREPARING DANISH PASTRY
John F. Schaible, Easton, Pa., and Simon S. Jackel, New York, N.Y., assignors to Baker Research Development Service, Inc., New York, N.Y., a corporation of New York
No Drawing. Filed June 8, 1964, Ser. No. 373,534
6 Claims. (Cl. 99—92)

ABSTRACT OF THE DISCLOSURE

Process of making Danish pastry wherein a plurality of hard, discrete particles of pastry butter are dispersed in developed dough, followed by rolling, folding and shaping.

---

The present invention relates to a simple and effective method for making Danish pastry. Danish pastry is a sweet leavened dough product consisting of many layers of high quality leavened dough separated during the baking process by films of pastry butter.

Although the ingredients used in making Danish pastry are very important, the principal characteristics of the baked product are a result of processing which provides alternating layers of fat (pastry butter) and dough. The effect of Danish is due to the separation and number of layers and it is thus readily apparent that the pastry butter should not be absorbed into the dough. If the fat does permeate into the dough, shortening occurs and the Danish effect is destroyed. For this reason, the pastry butter employed must be selected with some care. In the early part of this century. Danish butter was reputed to be of the best quality for this purpose because it was extra plastic and waxy. Today, however, there are many margarines and fats available in the United States having these properties.

The principal ingredients of typical Danish pastries are as follows:

(1) Rich, light moist type Danish.—11% bread flour (gluten content 10–12%), 25% roll-in fat.
(2) Medium flake Danish.—75% bread flour, 25% pastry flour (gluten content 7–8%), 30% roll-in fat.
(3) Full flake Danish.—66⅔% bread flour, 33⅓% pastry flour, 33⅓% roll-in fat.

Fairly representative overall formulas in this country are as follows:

Flour 100%
Sugar 15–20%
Fat 15–20% (including 20% of fat content of a mono-type softener)
Salt 1½–2%
Milk solids 5%
Eggs 13–20% whole eggs, or 8–10% egg yolks
Yeast 4–6%
Flavoring to suit, typically ½–1% (vanilla, nutmeg, lemon, butter, flavor, cardaman, etc.)
Water 57–60%
Roll-in fat 15–33⅓% of the dough weight Danish pastry is typically made as follows:
The dough is mixed at either low speed for relatively short duration to form a dough with very little development or at higher speeds beyond cleanup for highly developed Danish. The dough is then permitted to ferment at room temperature for about one hour. The dough is then scaled into convenient size pieces (12–15 pounds) and shaped to fit trays. Trays loaded with the dough are then placed in a refrigerator at a temperature of about 34–38° F. for at least one hour to permit the dough to relax. The chilled dough is then rolled out into a sheet and pastry butter applied to two thirds of one side of the sheet. One third of the sheet (with no margarine) is then folded over the center third of the sheet and the remaining third is folded on top. In this manner three layers of dough and two of fat are formed. This is called a three-fold roll and is the most customary roll-in procedure in Danish pastry making although four-fold and two-fold rolls are known. The folded dough is then returned to the retarder for at least an hour. The dough is then rolled into a sheet and again folded, but without the use of pastry butter. If a three-fold roll-in is employed on this second roll-in, two dough surfaces come into direct contact to form a single dough layer during the first fold. The net result of two three-fold rolls, therefore, is 7 layers of dough and six layers of fat. At least two more chilling, sheeting and rolling procedures are necessary to produce good Danish. After four three-fold rolls, a product of 109 layers (55 dough, 54 fat) will be formed. Some Danish pastries are known, however, to have as many as 300 and more layers. Where a plurality of the same type (i.e. three-fold rolls) of folds are employed, the number of layers of the Danish product can be calculated as follows:

Layers of fat$=(X-1)\cdot(X)^{n-1}$
Layers of dough$=1+(X-1)\cdot(X)^{n-1}$
Total$=1+2\cdot(X-1)\cdot(X)^{n-1}$ wherein $X$ represents the number of folds in a given roll, and $n$ represents the number of times that the dough is rolled and folded.

As an example, for a three-fold roll performed four times, the total number of layers would be equal to $$1+2(3-1)(3)^3=1+108=109$$

It is readily apparent from the above, that the production of Danish pastry is a detailed and costly process requiring a great deal of hand labor and time.

It is an object of the present invention to provide a very simple process for making Danish pastry.

It is a further object of the invention to provide such a process which requires very little time for the preparation of Danish pastry.

It is still a further object of the present invention to provide a formulation for making Danish pastry and to provide Danish pastry of high quality. These and other objects, which will become apparent from the following description, are achieved according to the present invention by incorporating small discrete particles of pastry butter in a Danish pastry dough.

Pastry butter for use in Danish pastry should be quite waxy, plastic and pliable. Lard, butter, table margarine, polyunsaturated margarines and a range of commercial margarines having a melting point range of about 112 to 120° F. are available for this purpose and may be modified by the addition of hard fat having a high melting point for reasons appearing hereinafter. Hydrogenated vegetable shortening, with or without an emulsifier, may be employed.

Particulate particles of fat may be prepared according to the present invention by any of several convenient methods. In a first method, plastic or melted shortening (pastry butter) is pressed into holes in a metal plate. The holes determine the size of each individual particle. Particles having a diameter of from about ¹⁄₁₆ inch to ½ inch have proven eminently suitable. The loaded plate is then stored in a freezer for a time sufficient to harden the shortening. For high melting materials, such as those having a hard fat (melting point about 145° F.) content of about 5%, a few hours in a freezer will set the shortening hard. For unmodified shortening longer periods (of up to 48 hours) will suffice. This time element will, of course, depend on the freezer temperature. The hardened material is expelled from the metal plate by means of a bank of rods.

The particular means for forming the pellets or particles is not, of course, critical but the exemplified manner is quite successful in that large quantities of the particles can be rapidly formed. Another convenient method is to extrude the shortening into rods and dicing the rods into suitable lengths. The hard or "frozen" pellets may be coated with flour to prevent agglomeration at higher temperatures. The hard pellets are ready for use and may be conveniently stored under refrigeration awaiting actual incorporation into the dough.

In the second method, particles of the shortening produced as above are coated with an inert encapsulating material. An aqueous sugar solution of gum arabic has been effectively used to encapsulate the shortening. Many other coatings, however, are generally known in the food industry and include gelatin, gum acacia, gum tragacanth, etc. Typical coating materials are well known and more fully disclosed in prior art patents such as U.S. patent No. 2,913,342, granted Nov. 17, 1959. A coating of flour is then added to the encapsulated material to form a dry coating and prevent agglomeration.

Particles of shortening prepared according to either of the aforementioned methods are then utilized in making Danish pastry. Due to the use of particulate roll-in fat, only a minimum number of roll-ins is required to provide excellent Danish with a consonant reduction in labor and time together with an increase in output for a given capital investment. The process involves addition of the frozen particles to a Danish pastry dough composition, gently mixing the ingredients to distribute the particles, allowing the dough to ferment, followed by a single roll out and Danish fold, and lastly a final roll out followed by application of fillings, etc., shaping as desired and baking. The product is an excellent Danish made by a process which may involve as few as one Danish roll-in and fold step.

Danish pastry may be made according to the present invention, by utilizing particulate pastry butter in conjunction with formulations which are generally recognized as being typical. Specific illustrations of the use of particulate pastry butter with such formulations follow:

Example I

|  | Weight (grams) | Percent of Total Flour |
| --- | --- | --- |
| Bread Flour (12% protein) | 333.3 | 66.66 |
| Cake Flour (7% protein) | 166.6 | 33.33 |
| Water | 250.0 | 50.0 |
| Hydrog. Vegetable Shortening | 70.0 | 14.0 |
| Non Fat Dry Milk | 25.0 | 5.0 |
| Sugar | 100.0 | 20.0 |
| Whole Eggs | 100.0 | 20.0 |
| Yeast | 30.0 | 6.0 |
| Salt | 7.5 | 1.5 |
| Vanilla | 3.75 | .75 |
| Atmul 500 (Monoglyceride Emulsifier) | 14.0 | 2.8 |

The method of incorporating the above ingredients follows any procedure already acceptable for the production of roll-in pastry. In this example, however, the yeast was mixed with half of the water and added to the other ingredients in the mixing bowl. The remainder of the water was then added, and all the ingredients mixed at low speed till all the materials were wetted and formed a uniform mass. The mixing machine was next shifted to medium speed, and the dough developed for 6 minutes. At this point, the machine was stopped, and the dough scraped down. The machine was next shifted into low speed, and while mixing at low speed, 366.5 g. of uncoated particles of margarine at a temperature of 0° F. were added. After mixing one minute at low speed, the particles were found to be uniformly distributed through the dough. The temperature of the dough was 62° F.

The dough was allowed to ferment 1 hour at room temperature, at which time the dough temperature was 69° F. This dough was then rolled out into a square shape, ½ inch thick, folded in thirds, and rolled lightly.

The dough was then placed on a greased pan, and chilled for 20 minutes in a refrigerator (retarder) for 20 minutes at 40° F.

Upon removal, the dough was rolled out to a thickness of ¼ inch, coated with a butter cream and streusel (at 10% of the dough weight), and the dough piece folded in half. From this 3 oz. strips were cut off, and after a 20 minute rest period, these were made up into twists. The individual twists were coated with egg wash and streusel, proofed one hour at 95° F., and then baked 15 minutes at 395° F. At the end of the baking period, the pieces were removed from the oven, glazed with a commercial pastry glaze, and allowed to cool.

The finished product was flaky, and considered excellent in appearance and eating quality. The handling quality of the dough piece during makeup was considered the same as that obtained in the usual roll in process.

In addition to the twists produced as above, the same procedure was used to prepare Danish pastry with cheese and fruit fillings, as well as rings and other shapes.

Example II

The particles may also be used with a prepared mix. A mix actually used contained all the essential ingredients except the water, yeast, eggs and flavor. The formula used for preparing pastry with this mix was as follows:

|  | Weight (grams) | Percent of Mix |
| --- | --- | --- |
| Royal Viking Danish Mix (Pillsbury Co.) | 800.0 | 100.0 |
| Water | 340.0 | 42.5 |
| Powdered Egg Yolk | 20.0 | 2.5 |
| Yeast | 48.0 | 6.0 |
| Vanilla | 2.0 | 0.25 |

The above ingredients were combined and developed in the mixer as with the preceding formula, but 443 grams of flour coated (408 gm. Fleischmanns Roll in Mix and 40 gms. of coating) particles at a temperature of 0° F. was added to the dough, and mixed for one minute at slow speed. The remainder of the procedure was the same as for the preceding formula and the results the same.

Example III

Danish pastry was prepared as in Example I, but after the dough was rolled out, folded in thirds, and rolled lightly, the dough was placed in a retarder for 24 hours. The retarded dough was warmed slightly to increase workability, and Danish was prepared as in Example I. The results were Danish pastry of excellent quality.

Example IV

Danish was prepared as in Example I, but instead of developing 6 minutes, the dough was developed only 2 minutes. The dough resulting from this procedure was very soft and pasty and caused problems in makeup.

Example V

Pastry was prepared as in Example I, but the particles were at a temperature of 60° F. when added to the dough. During the low speed mix, the particles lumped together and did not distribute uniformly through the dough. The resulting pastry was non-uniform and not satisfactory.

Example VI

Pastry was prepared as in Example I, but after adding the particles at 0° F., the dough was mixed for three minutes at slow speed. The particles broke up and became absorbed into the dough. The pastry made from this dough was very tender, but had no flakiness and did not have the characteristic chew and quality of good Danish pastry.

Example VII

Danish pastry was prepared as in Example I, but prior to makeup, the dough retarded for one hour was given another three fold roll and retarded again for an hour.

This was repeated twice more and concluded after overnight retardation. The product was excellent Danish, but not significantly better than that of Example I.

Any of the ingredients exemplified above may be varied within a range that will be consistent with producing a product with the handling properties suitable for the production of the pastry (machineability, etc.), as well as a product with the desired richness, flavor, chewability and appearance typical of Danish pastry.

Danish pastry is typically made with cold water (55° F.) to give a dough with a final temperature of 70° F. In the particle process, the addition of particles of approximately 0° F. in an amount equal to ¼ to ⅓ the weight of the dough reduces the temperature of the dough 15–20° F.

In the particle process, water at 80–85° F. is used to give a final dough temperature of 70° F. after the addition of the particles.

In the typical roll-in process, the dough may be mixed very little, or may be well developed. Where the dough is developed very little in the mixer, the additional development given in the roll in process is counted on to give the dough the proper handling quality, and give the final product its characteristic appearance and eating quality.

In the particle process, there is only one roll and fold before makeup, and thus the dough must be developed in the mixer to give the proper handling and final product qualities. The development given in the particle process is the same as that for conventional roll-in where the characteristics of a well developed dough are desired.

Typical leavening ingredients are as follows:

Compressed Yeast in the range 4–6%.
Active Dry Yeast in the range of 1.6–2.4%.

The particles may be made of any one of several fats including:

(1) Hydrogenated Vegetable Shortening (Cottonseed, Soy, Peanut)—M.P. 108–113° F.
(2) Hydrogenated Vegetable Shortening with monoglyceride emulsifier.—M.P. 108–113° F.
(3) Dairy Butter—M.P. 95–98° F.
(4) Margarine: Typical formulation would be: M.P. 100–122° F. (Depending on type and season).
   Hydrogenated Vegetable Oil: 80%.
   Cultured Non Fat Milk, Salt, 20%.
   Emulsifiers, moisture: 20%.
(5) Mixtures of any two or more of the above.

The particles may be prepared by any of several methods of manufacture. Any of the shortenings (1, 2, 3, 4, 5) may be extruded through an orifice or row of orifices preferably round, and a diameter 1/16 inch to ½ inch. To facilitate cutting, and later to keep the particles separate, the shortening is extruded onto a bed of either wheat flour, or starch, and then covered with additional flour. The shortening may now be cut into convenient lengths of ¼ inch to 1 inch long. After cutting, the particles and flour are placed on a sieve and the flour separated from the particles. The particles will have a coating of either flour or starch amounting to 10 to 15% of their original weight. The coated particles are next transferred to a freezer at 0° F. or lower till ready for use.

A variation of this process may also be used in which after extruding and cutting, the shortening is either dipped or sprayed with a syrup consisting of sucrose, gum arabic, and water.

The proportions of the syrup ingredients are variable. A typical formulation is as follows:

|  | Percent |
|---|---|
| Sucrose | 30 |
| Gum Arabic | 15 |
| Water | 55 |

After coating with the syrup, the particles are rolled in wheat flour, and sieved. After drying, the flour syrup coating forms a protective coating. In any case, a coating of the above type is a convenience for handling, but not a necessary condition for the basic principle. As with the plain flour or starch coating, the particles are brought to 0° F. till ready for use. The coating in the above process amounts to 25–30% of weight of the particles.

In another process, a die is prepared by drilling ¼ inch holes in a plate ¼ inch thick. The plastic margarine is pressed into these holes, and the die plate with the shortening is chilled to approximately 0° F. At this temperature, the shortening may be ejected from the die by means of a plunger or series of plungers. The particles thus produced may be coated as in the previous methods, or left uncoated and kept at 0° F.

As with the coating process, the method of manufacture is not essential to the basic principle, so long as the method of manufacture does not alter the properties of the shortening.

The shape of the particles is apparently of no importance to the process. Cylindrical particles, circular in cross section were used because of the ease of producing this shape. Cylinders of some polygonal cross section may also be used, as well as shapes which are cubical, spherical or ovoid. The size can be varied on extruded particles as follows:

Diameter: 1/16 inch to ½ inch.
Length: ¼ inch to 1 inch.

Spherical or ovate particles may have a diameter in the range 1/16 inch to ½ inch.

Cubic and rectangular particles may vary in size as follows:

Thickness: ⅛″ to ½″.
Width: ¼″ to 1″.
Length: ¼″ to 1″.

The temperature of the particles at the time of addition to the dough is determined by several factors. These are:

(1) Melting point of the shortening. In general, the lower the melting point of the shortening, the lower should be the temperature of the particles.
(2) The coating.—The more protective the coating, the less the need for a low temperature.
(3) The length of time to distribute the particles in the mixing operation, and the vigor of the mixing. The shorter the time to distribute the particles, and the gentler the mixing, the less the need for a low temperature.

The following conditions have been found suitable:

Particle Temperature: −10° F. to + 10° F.
Mixing Time To Distribute: 30 seconds to 1 minute
Machine Speed: Slow (on 3 speed machine)

The instant invention provides Danish pastry of excellent quality by a method which requires, for example, only four hours from start to finish as compared to heretofore known methods which require at least 24 hours to make Danish of comparable quality.

What is claimed is:
1. A process of making Danish pastry comprising the steps of:
   mixing a leavened Danish pastry dough comprising flour, shortening and water;
   developing said dough;
   adding a plurality of small, hard, discrete particles comprising pastry butter to the developed dough;
   mixing said dough and particles to provide a leavened Danish pastry dough containing said plurality of small, discrete pastry butter particles;
   rolling and folding the mixed dough at least once;
   forming the rolled and folded dough into pastry shape; and
   baking said dough.
2. A process as claimed in claim 1 wherein said small discrete particles comprise pastry butter selected from the group consisting of margarine, hydrogenated vegetable oils, butter and mixtures thereof encapsulated by a coating of gum arabic and sugar.

3. A process as claimed in claim 1 wherein said rolling and folding step is performed no more than twice.

4. A process for making Danish pastry comprising the steps of developing a yeast-leavened Danish pastry dough comprising hard flour having a protein content of approximately 10–11%, adding a plurality of small, hard, discrete particles comprising a pastry butter selected from the group consisting of margarine, hydrogenated vegetable oils, butter and mixtures thereof to the fully developed dough, gently mixing the dough to disperse said particles in the dough to provide dough containing said plurality of discrete particles incorporated therein, holding the dough at room temperature to permit fermentation, retarding the fermented dough, performing the following two steps once:

(a) rolling out the retarded dough into a sheet, and
(b) folding the sheet such that a portion of said sheet overlaps another portion of said sheet, forming the rolled and folded dough into pastry shape, and baking the shaped dough to form Danish pastry.

5. A process as claimed in claim 4 wherein the rolling and folding steps are performed twice.

6. A process as claimed in claim 4 wherein said pastry butter is cooled to a temperature of from about −10° F. to +10° F. before addition to the fully developed dough.

References Cited

UNITED STATES PATENTS

| | | | |
|---|---|---|---|
| 2,522,591 | 9/1950 | Wilson et al. | 99—92 |
| 2,913,342 | 11/1959 | Cameron et al. | 99—123 |
| 3,250,627 | 5/1966 | Thelen | 99—92 |
| 3,255,016 | 6/1966 | Parker | 99—94 |

OTHER REFERENCES

Matz, "Bakery Technology and Engineering," 1960, pp. 304, 305, The Ari Publishing Co., Inc., Westport, Conn., TX 763, M33.

"The Bakers Digest," Apr. 1964, pp. 66, 72, TX 761 S5.

Rombauer et al. "The Joy of Cooking," 1953, pp. 628–629.

The Bobbs-Merrill Co., Inc., New York, TX 715 R75.

RAYMOND N. JONES, *Primary Examiner.*